Patented May 19, 1953

2,639,237

UNITED STATES PATENT OFFICE 2,639,237

TEA EXTRACTION

William R. Johnston, Bronxville, Ismar M. Reich, New York, and Glennard E. Miller, Bronx, N. Y., assignors to Standard Brands Incorporated, New York, N. Y., a corporation of Delaware No Drawing. Application July 20, 1950, Serial No. 175,024

4 Claims. (Cl. 99—77)

This invention relates to an improved process for preparing a water extract of tea which may be concentrated or dried. At the proper concentration the product yields a most acceptable tea beverage.

It is customary in the manufacture of such extracts on a commercial scale to pass hot water through columns of tea leaves in the presence of air. It is difficult to operate the cylindrical extractors efficiently because the air retained by the tea leaves results in the formation of gas pockets, which tend to reduce or stop the flow of extract or promote excessive pressure drop in the extractors. Accordingly, the extractors holding the tea column can be only partially filled with tea leaves and usually only a little over half filled. Furthermore, with air in the extractors there is a tendency for channelling to take place in the tea column.

It is possible on a laboratory scale to avoid these difficulties by operating in a vacuum as described in U. S. Patent No. 2,235,700. Vacuum operation on a commercial scale is not practical because of unavoidable air leaks. Through extensive research it has been found that efficient commercial operation can be effected by replacing the air in contact with the tea leaves by carbon dioxide gas prior to extraction. When the extractors are filled with tea and carbon dioxide rather than with tea and air, they can be charged with much more tea, even to the point of being substantially filled without any danger of causing excessive pressure drop. Apparently the water solubility of carbon dioxide promotes wetting of the tea leaves, thus avoiding the formation of gas pockets. Even if not completely dissolved in the extract, the carbon dioxide probably can migrate to the top of the extractor via the wet tea leaves without becoming trapped in pockets as is air, which is substantially insoluble in the extract and tends to prevent wetting of the tea leaves. The wetting effect of carbon dioxide also tends to prevent channelling in the tea column, thus promoting uniform extraction and higher yields.

In carrying out the invention the air may be removed from the extractors and replaced with carbon dioxide in any desired manner. For instance, the extractor may be charged with tea leaves, then evacuated and the evacuated extractor charged with carbon dioxide to a pressure substantially equal to or higher than atmospheric pressure. Also, the air can be flushed out with a stream of carbon dioxide instead of being evacuated. It is not necessary that the atmosphere in contact with the tea leaves consist substantially entirely of carbon dioxide because good results are obtained when it contains as much as 5 to 10 per cent air.

To show the improvements obtained according to the invention, a series of extractions were made in a battery of five cylindrical extractors operated on the countercurrent principle. In each series the procedure and conditions were identical except that in the first series the charge of tea leaves was in contact with air at the start of the extraction, whereas in the other series the extractors were filled with carbon dioxide before extraction and the charge in each column was 130% to 145% of the charge used in the first series. In the second series the extractors were charged with tea, evacuated to 28 to 29 inches of mercury gauge vacuum and then filled with carbon dioxide to a gauge pressure of 2 pounds per square inch. In the latter case the average yield of extractable tea solids was increased to 115% of the yield obtained in the first series, based in each case on the weight of tea leaves charged. In another run with carbon dioxide an even greater yield, amounting to 130% relative to the first series, was obtained. This yield was obtained using a charge of tea leaves amounting to 145% of the charge used in the first series.

*Tea extraction*

| | Atmosphere | Relative Tea Charge | Relative Yield of Tea Solids |
|---|---|---|---|
| Series I | Air | 100 | 100 |
| Series II | $CO_2$ | 130 | 115 |
| Series III | $CO_2$ | 145 | 130 |

It is to be understood that when we speak of extraction with water in the appended claims we intend to include extraction with water containing added edible substances. For instance, the extraction may be performed with a tea infusion and with water or a tea infusion containing carbohydrates such as corn syrup.

We claim:

1. The process of producing a tea extract which comprises charging an extractor with tea leaves, evacuating air from the extractor, filling the evacuated extractor with carbon dioxide and then passing water through said extractor.

2. The process of producing a tea extract which comprises charging an extractor with tea leaves, replacing nearly all of the air therein with carbon dioxide and then passing water through the extractor.

3. The process of producing a tea extract which comprises charging an extractor with tea leaves, replacing nearly all of the air therein with carbon dioxide to a pressure at least equal to atmospheric pressure and then passing water through the extractor.

4. The process of producing a tea extract which comprises extracting with water a column of tea leaves at a pressure which is at least atmospheric in an ambient atmosphere of carbon dioxide containing not more than 10% of air.

WILLIAM R. JOHNSTON.
ISMAR M. REICH.
GLENNARD E. MILLER.

References Cited in the file of this patent

UNITED STATES PATENTS

| Number | Name | Date |
|---|---|---|
| 1,094,675 | Moncrief | Apr. 28, 1914 |
| 2,235,700 | Eldred | Mar. 18, 1941 |